US010698159B2

(12) United States Patent
Bian et al.

(10) Patent No.: US 10,698,159 B2
(45) Date of Patent: Jun. 30, 2020

(54) MULTIPLE-LAYER ARRANGEMENTS INCLUDING ONE OR MORE DIELECTRIC LAYERS OVER A WAVEGUIDE

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 91 days.

(21) Appl. No.: 16/165,600

(22) Filed: Oct. 19, 2018

(65) Prior Publication Data
US 2020/0124796 A1  Apr. 23, 2020

(51) Int. Cl.
*G02B 6/136* (2006.01)
*G02B 6/122* (2006.01)

(52) U.S. Cl.
CPC ............ *G02B 6/136* (2013.01); *G02B 6/122* (2013.01)

(58) Field of Classification Search
CPC .......... G02B 6/122; G02B 6/136; G02B 6/10; G02B 6/12; G02B 6/12002; G02B 6/12004; G02B 2006/12085; G02B 2006/12097; G02B 2006/121; G02B 2006/12166; G02B 2006/12176; G02B 6/13
See application file for complete search history.

(56) References Cited

U.S. PATENT DOCUMENTS

| 5,991,487 | A | * | 11/1999 | Sugiyama | .......... | G02B 6/12004 |
| | | | | | | 257/E31.128 |
| 7,808,337 | B2 | | 10/2010 | Rosenberg et al. | | |
| 8,380,032 | B2 | * | 2/2013 | Hasegawa | .............. | B82Y 20/00 |
| | | | | | | 359/27 |
| 9,110,219 | B1 | * | 8/2015 | Zhang | ................... | G01J 1/0425 |
| 9,207,400 | B2 | | 12/2015 | Ouyang et al. | | |
| 2013/0188918 | A1 | * | 7/2013 | Painchaud | ............. | G02B 6/036 |
| | | | | | | 385/130 |

FOREIGN PATENT DOCUMENTS

JP       H03167903 A       7/1991

OTHER PUBLICATIONS

Yin et al., "Resonant splitting in periodic T-shaped photonic waveguides", J. Appl. Phys. 112, 033522 (2012).
Bian et al., "T-shaped dielectric slot waveguides for efficient control of birefringence and polarization independent directional coupling", Optics Communications 285 (2012) 5118-5121.
(Continued)

*Primary Examiner* — John Bedtelyon
(74) *Attorney, Agent, or Firm* — Thompson Hine LLP; Francois Pagette

(57) ABSTRACT

Structures that include a waveguide and methods of fabricating a structure that includes a waveguide. A first dielectric layer comprised of a first silicon nitride is formed. The waveguide is arranged over the first dielectric layer. A second dielectric layer is formed that is arranged over the waveguide. The second dielectric layer is composed of a second silicon nitride having a lower absorption of optical signals than the first silicon nitride.

20 Claims, 4 Drawing Sheets

(56) References Cited

OTHER PUBLICATIONS

Feng et al., "T-Shape Suspended Silicon Nitride Ring Resonator for Optical Sensing Applications", IEEE Photonics Technology Letters, vol. 27, No. 15, Aug. 1, 2015.
Karppinen et al., "Optical coupling structure made by imprinting between single-mode polymer waveguide and embedded VCSEL", Optical Interconnects XV, edited by Henning Schroder, Ray T. Chen, Proc. of SPIE vol. 9368, 93680H • © 2015 SPIE.
Zhai et al., "Reverse Ridge/Slot Chalcogenide Glass Waveguide With Ultrabroadband Flat and Low Dispersion", IEEE Photonics Journal, vol. 7, No. 5, Oct. 2015.

\* cited by examiner

MULTIPLE-LAYER ARRANGEMENTS INCLUDING ONE OR MORE DIELECTRIC LAYERS OVER A WAVEGUIDE

BACKGROUND

The present invention relates to photonics chips and, more specifically, to structures that include a waveguide and methods of fabricating a structure that includes a waveguide.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

The optical components of a photonics chip may be fabricated by patterning a layer composed of silicon nitride. The optical components are formed over a dielectric layer stack that includes a layer of silicon nitride defining a continuous and unbroken slab over the optical components. Because of the manner in which it is deposited, the silicon nitride in this slab incorporates hydrogen that, through nitrogen-hydrogen bonds, causes absorption of the optical signals propagating in the optical components. An unwanted consequence of the absorption is optical loss, which may be undesirable for long-range routing of the propagating optical signals in the optical components of the photonics chip.

Improved structures that include a waveguide and methods of fabricating a structure that includes a waveguide are needed.

SUMMARY

In an embodiment of the invention, a structure includes a first dielectric layer comprised of a first silicon nitride, a waveguide arranged over the first dielectric layer, and a second dielectric layer arranged over the waveguide. The second dielectric layer is composed of a second silicon nitride having a lower absorption of optical signals than the first silicon nitride.

In an embodiment of the invention, a method includes forming a first dielectric layer comprised of a first silicon nitride, forming a waveguide arranged over the first dielectric layer, and forming a second dielectric layer arranged over the waveguide. The second dielectric layer is composed of a second silicon nitride having a lower absorption of optical signals than the first silicon nitride.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
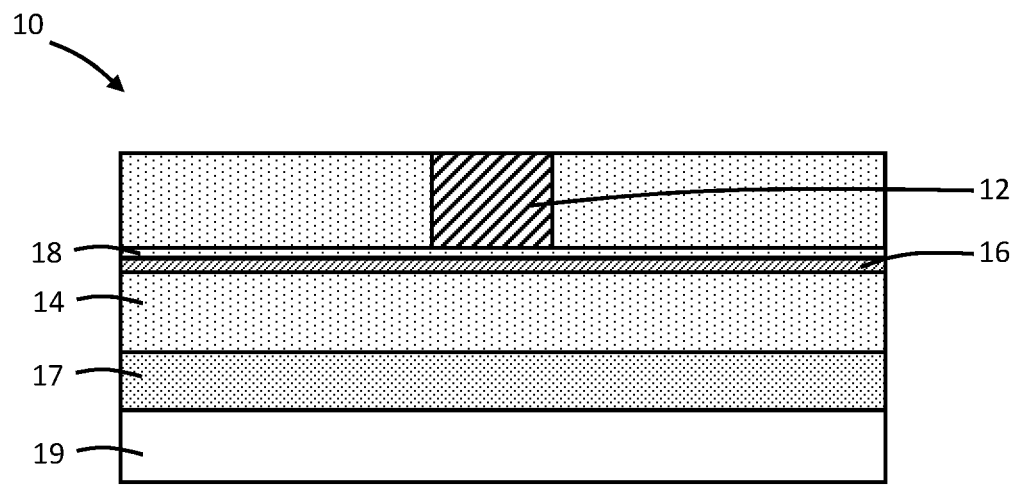
FIGS. 1-2 are cross-sectional views of a waveguide structure at successive fabrication stages of a processing method in accordance with embodiments of the invention.

With reference to FIG. 1 and in accordance with embodiments of the invention, a structure 10 includes a waveguide 12 that is arranged on a layer stack including dielectric layers 14, 16, 18. The dielectric layers 14, 16, 18 of the layer stack are formed over a buried insulator layer 17 of a silicon-on-insulator (SOI) wafer. The buried insulator layer 17 may be composed of a dielectric material, such as silicon dioxide, and is arranged over a substrate 19 of the SOI wafer. The waveguide 12 may be formed by depositing a layer of a dielectric material on the dielectric layer 18 and patterning the deposited layer with lithography and etching processes that form an etch mask over the deposited layer and etch the masked layer with an etching process, such as reactive ion etching (ME) or a wet chemical etching process. In an embodiment, the waveguide 12 may be composed of silicon nitride that lacks hydrogen in its composition and that is etched using a wet chemical solution containing hydrofluoric acid. As used herein, the waveguide 12 represents a waveguide core in which optical signals propagate. The waveguide 12 may be used to route optical signals on a photonics chip formed using the SOI wafer.

The dielectric layer 14 and the dielectric layer 18 may each be composed of a dielectric material, such as an oxide of silicon (e.g., silicon dioxide), deposited by atomic layer deposition (ALD) or chemical vapor deposition (CVD). The dielectric layer 16 may be composed of silicon nitride deposited by plasma-enhanced chemical vapor deposition (PECVD). The dielectric layer 16 may find use in other regions of the SOI wafer containing standard logic devices as a silicide-blocking layer in a so-called OP process. The silicon nitride of the dielectric layer 16 incorporates hydrogen that, through nitrogen-hydrogen bonds, may absorb the optical signals propagating in the waveguide 12. Following its deposition, the dielectric layer 16 defines a continuous slab that is arranged over the dielectric layer 14.

Figure 2:
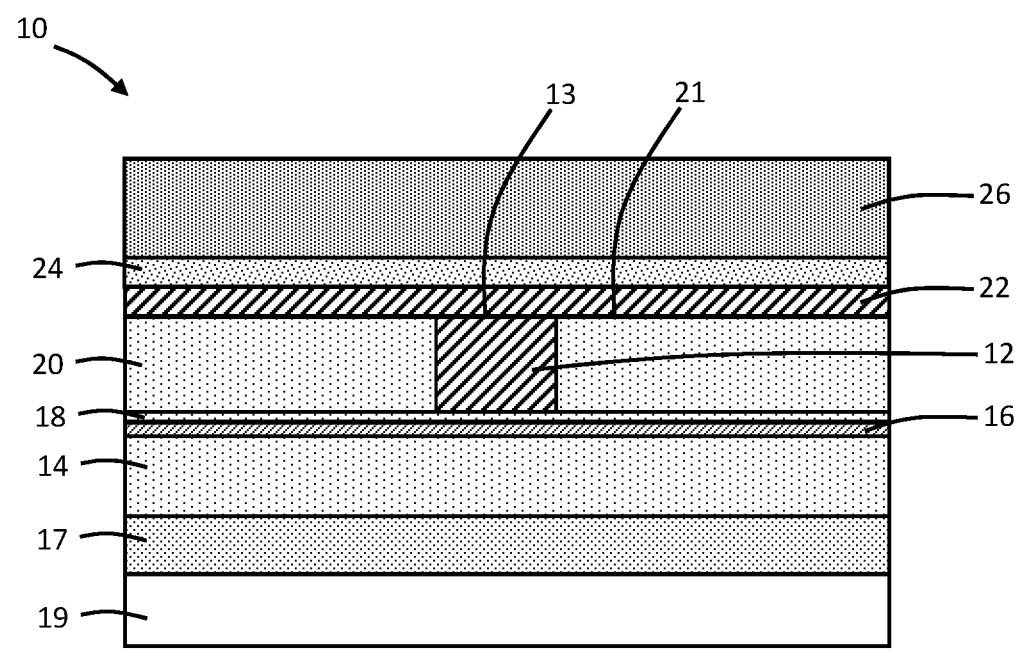

With reference to FIG. 2 in which like reference numerals refer to like features in FIG. 1 and at a subsequent fabrication stage, a dielectric layer 20 is formed over the dielectric layer 18. The dielectric layer 20 is arranged to surround the waveguide 12 and may have a top surface 21 that is coplanar with a top surface 13 of the waveguide 12. The dielectric layer 20 may be composed of a dielectric material, such as silicon dioxide, deposited by chemical vapor deposition. The dielectric layer 20 may be formed by depositing a layer of its constituent dielectric material and planarizing the deposited layer with, for example, chemical mechanical polishing (CMP). For example, the dielectric layer 20 may be composed of silicon dioxide deposited by chemical vapor deposition using ozone and tetraethylorthosilicate (TEOS) as reactants.

A dielectric layer 22 is formed over the top surface 21 of the dielectric layer 20 and the top surface 13 of the waveguide 12. In the representative embodiment, the dielectric layer 22 is formed in direct contact with the top surface 13 of the waveguide 12. The dielectric layer 22 may be composed of a dielectric material, such as silicon nitride, deposited by atomic layer deposition or chemical vapor deposition. In an embodiment, the dielectric layer 22 may be composed of the same dielectric material as the waveguide 12. In an embodiment, the dielectric layer 22 and the waveguide 12 may each be composed of silicon nitride. The dielectric layer 16, the waveguide 12, and the dielectric layer 22 define a multiple layer arrangement that is tiered in multiple levels to have an "I"-shape.

The dielectric layer 22 is composed of a different dielectric material than the dielectric layer 16. In an embodiment, the dielectric layer 22 may be composed of silicon nitride that lacks incorporated hydrogen, and the dielectric layer 16 may be composed of silicon nitride that incorporates hydrogen. The difference in composition may arise from the different deposition techniques used to deposit the silicon nitride.

A dielectric layer 24 is formed over the dielectric layer 22. In an embodiment, the dielectric layer 24 is composed of an undoped oxide of silicon (e.g., undoped silicon dioxide) deposited by chemical vapor deposition or atomic layer deposition. A multilayer back-end-of-line stack, generally indicated by reference numeral 26, is formed by back-end-of-line (BEOL) processing over the dielectric layer 24. The back-end-of-line stack 26 may include one or more interlayer dielectric layers composed of dielectric materials, such as a carbon-doped silicon oxide, and metallization composed of, for example, copper, tungsten and/or cobalt that is arranged in the one or more interlayer dielectric layers. The dielectric layer 22 is not patterned following its deposition and prior to the formation of the back-end-of-line stack 26.

The structure 10, in any of its embodiments described herein, may be integrated into a photonics chip that includes electronic components and additional optical components. For example, the electronic components may include field-effect transistors that are fabricated by CMOS front-end-of-line (FEOL) processing using the semiconductor material of the device layer of the SOI wafer.

The dielectric layer 22 over the waveguide 12 may be effective to shift the mode distributions of the optical signals propagating in the waveguide 12 away from the dielectric layer 16 of hydrogen-containing dielectric material (e.g., silicon nitride) beneath the waveguide 12. The vertical shift of the mode distributions reduces the modal overlap for either TE mode or TM mode with the dielectric layer 16. As a result of the shift, the absorption in the dielectric layer 16 may be reduced, which results in a reduction in the propagation loss of the waveguide 12 in comparison with the propagation loss suffered by conventional waveguide structures that lack the dielectric layer 22.

Figure 3:
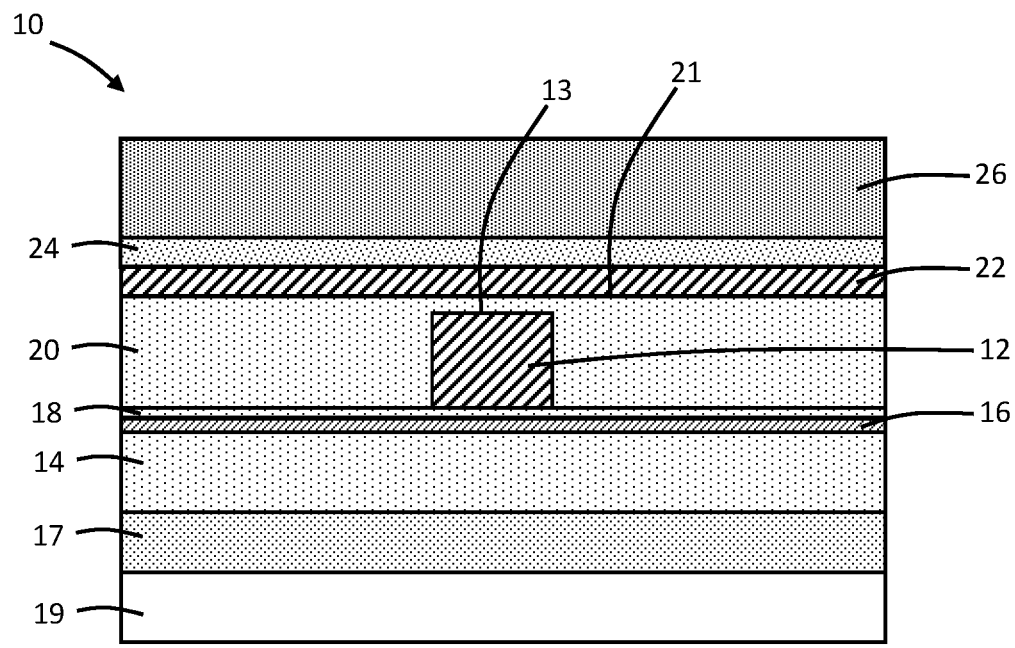
FIGS. 3-8 are cross-sectional views of waveguide structures in accordance with alternative embodiments of the invention.

With reference to FIG. 3 in which like reference numerals refer to like features in FIG. 2 and in accordance with alternative embodiments of the invention, the structure 10 may be modified by increasing the thickness of the dielectric layer 20 such that the waveguide 12 is buried in the dielectric layer 20. The top surface 13 of the waveguide 12 is covered by a portion of the dielectric layer 20 and the top surface 21 of the dielectric layer 20, including the portion covering the top surface 13 of the waveguide 12, is arranged over the top surface 13 of the waveguide 12. The dielectric layer 22 is formed over the top surface 21 of the dielectric layer 20. As a result of the increased thickness of the dielectric layer 20, the covering portion of the dielectric layer 20 is arranged between the dielectric layer 22 and the top surface 13 of the waveguide 12, which prevents direct contact between the dielectric layer 22 and the waveguide 12 and thereby results in a non-contacting relationship between the dielectric layer 22 and the top surface 13 of the waveguide 12.

Figure 4:
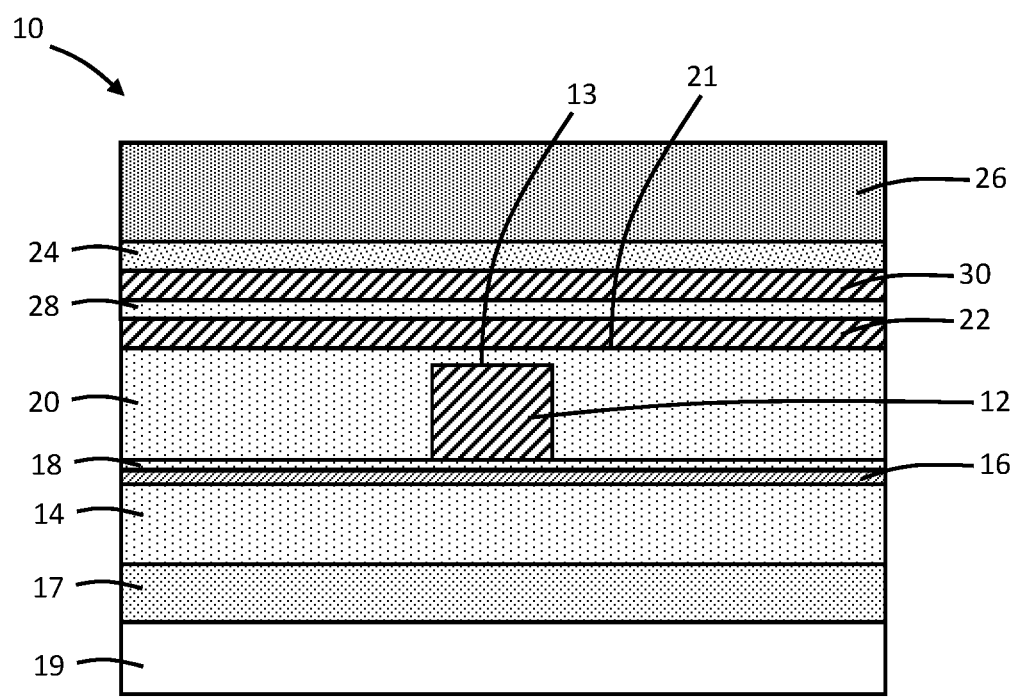

With reference to FIG. 4 in which like reference numerals refer to like features in FIG. 3 and in accordance with alternative embodiments of the invention, the structure 10 may be modified by forming a layer stack including dielectric layers 28, 30 that are arranged over the dielectric layer 20. The dielectric layer 28 may be composed of a dielectric material, such as an oxide of silicon (e.g., silicon dioxide), deposited by atomic layer deposition or chemical vapor deposition. The dielectric layer 30 may be composed of a different dielectric material, such as silicon nitride, that is deposited by atomic layer deposition or chemical vapor deposition. Similar to the dielectric layers 22, 24, the dielectric layers 28, 30 are not patterned after their deposition. In an embodiment, the dielectric layer 30 may be composed of silicon nitride that lacks incorporated hydrogen similar to the composition of the dielectric layer 22. The layer stack including the dielectric layers 28, 30 may be modified to include one or more additional dielectric layers similar to dielectric layer 28 and/or dielectric layer 30.

Figure 5:
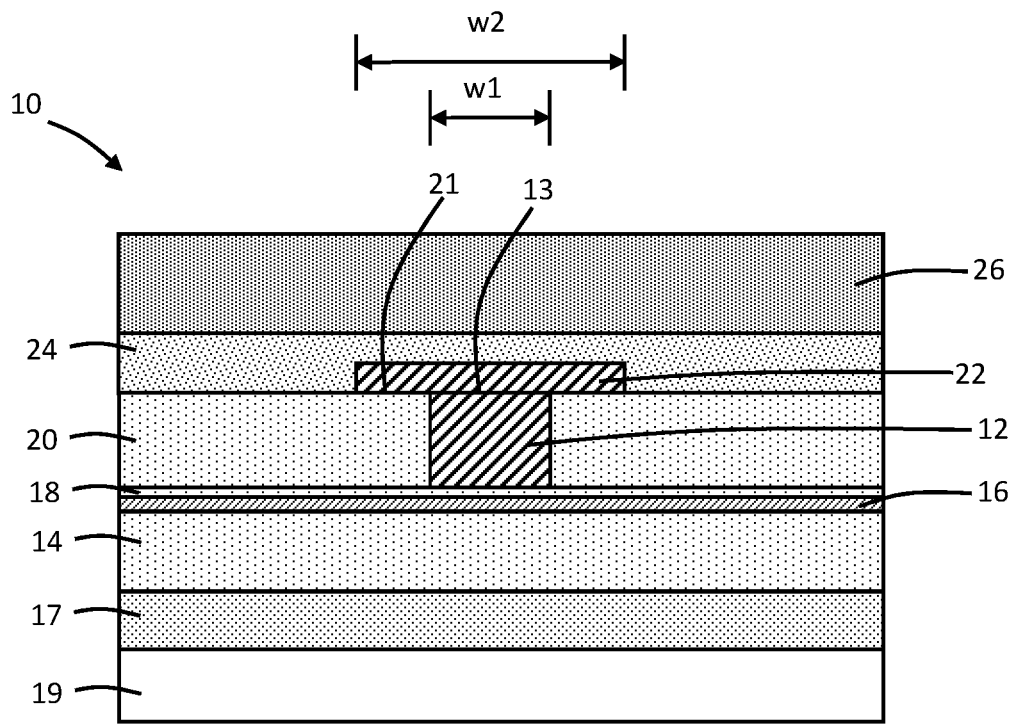

With reference to FIG. 5 in which like reference numerals refer to like features in FIG. 2 and in accordance with alternative embodiments of the invention, the structure 10 may be modified by patterning the dielectric layer 22 after deposition and before the formation of the dielectric layer 24. To that end, the dielectric layer 22 may be patterned with lithography and etching processes in which an etch mask is formed over the deposited layer and the masked layer is etched with an etching process, such as reactive ion etching. The etching process may remove the dielectric layer 22 selective to the materials of the waveguide 12 and the dielectric layer 20. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process. The dielectric material of the subsequently-deposited dielectric layer 24 may surround the patterned dielectric layer 22 over the surface area of the dielectric layer 20 that is exposed following the patterning of the dielectric layer 22.

The patterned dielectric layer 22 may have a centered arrangement over the waveguide 12, and may be formed in direct contact with the top surface 13 of the waveguide 12. In an embodiment, the width, w2, of the patterned dielectric layer 22 may be greater than the width, w1, of the waveguide 12 such that the entire top surface 13 of the waveguide 12 is in direct contact with the patterned dielectric layer 22. In an embodiment, the width, w2, of the patterned dielectric layer 22 may be greater than or equal to 1.1 times the width, w1, of the waveguide 12.

Figure 6:
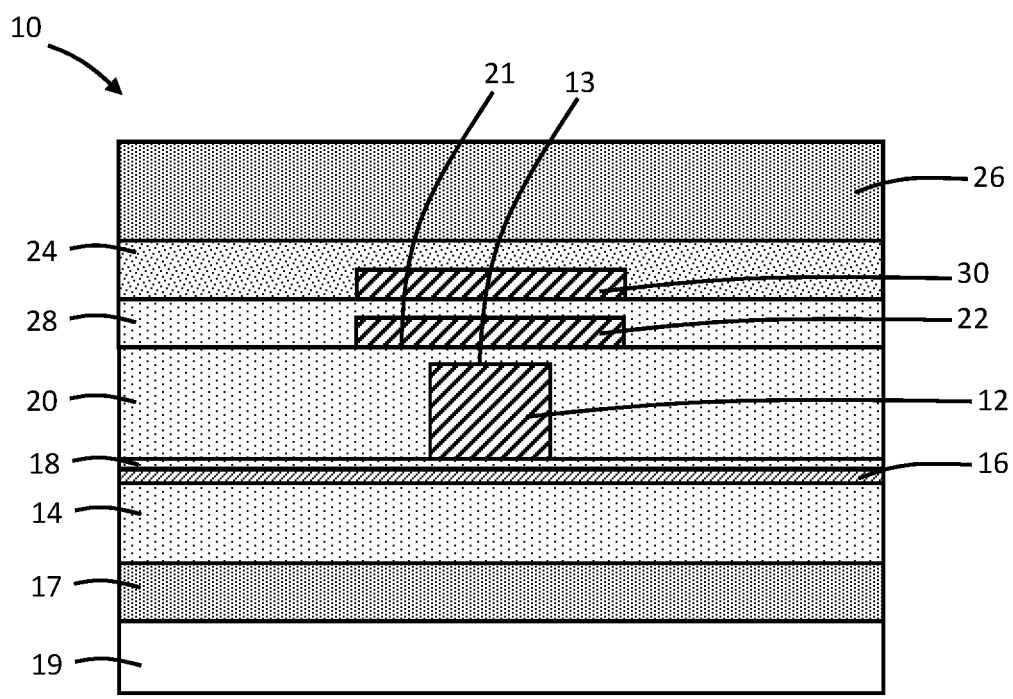

With reference to FIG. 6 in which like reference numerals refer to like features in FIG. 4 and in accordance with alternative embodiments of the invention, the dielectric layer 22 may be patterned after deposition as described in connection with FIG. 5. In the representative embodiment, a portion of the thickened dielectric layer 20 is arranged between the waveguide 12 and the patterned dielectric layer 22. In an alternative embodiment, the patterned dielectric layer 22 may have a directly contacting relationship with the top surface 13 of the waveguide 12. After patterning the dielectric layer 22, the dielectric layer 28 is deposited with a thickness that is greater than the thickness of the patterned dielectric layer 22 to establish a non-contacting relationship between the patterned layer 22 and the overlying dielectric layer 30.

Following the deposition of the dielectric layer 28, the dielectric layer 30 is formed over the dielectric layer 28 and patterned with lithography and etching processes. To that end, the dielectric layer 30 may be deposited by atomic layer deposition or chemical vapor deposition, an etch mask may be formed over the deposited layer, and the masked layer may be etched with an etching process, such as reactive ion etching. The etching process may remove the dielectric material of the dielectric layer 30 selective to the material of the dielectric layer 28. The dielectric material of the subsequently-deposited dielectric layer 24 may surround the patterned dielectric layer 30 over the surface area of the dielectric layer 28 that is exposed following the patterning of the dielectric layer 30. A portion of the dielectric layer 28 is arranged in a vertical direction between the patterned dielectric layer 22 and the patterned dielectric layer 30.

In an embodiment, the patterned dielectric layer 30 may be centered over the waveguide 12. In an embodiment, the patterned dielectric layer 22 and the patterned dielectric layer 30 may have equal or substantially equal widths, w2 (FIG. 5), that are each greater than the width, w1 (FIG. 5), of the waveguide 12 or, alternatively, that are each greater than or equal to 1.1 times the width, w1, of the waveguide 12. In an alternative embodiment, the patterned dielectric layer 22 and the patterned dielectric layer 30 may have different widths. For example, the patterned dielectric layer 22 may be wider than the patterned dielectric layer 30. As another example, the patterned dielectric layer 22 may be narrower than the patterned dielectric layer 30.

Figure 7:
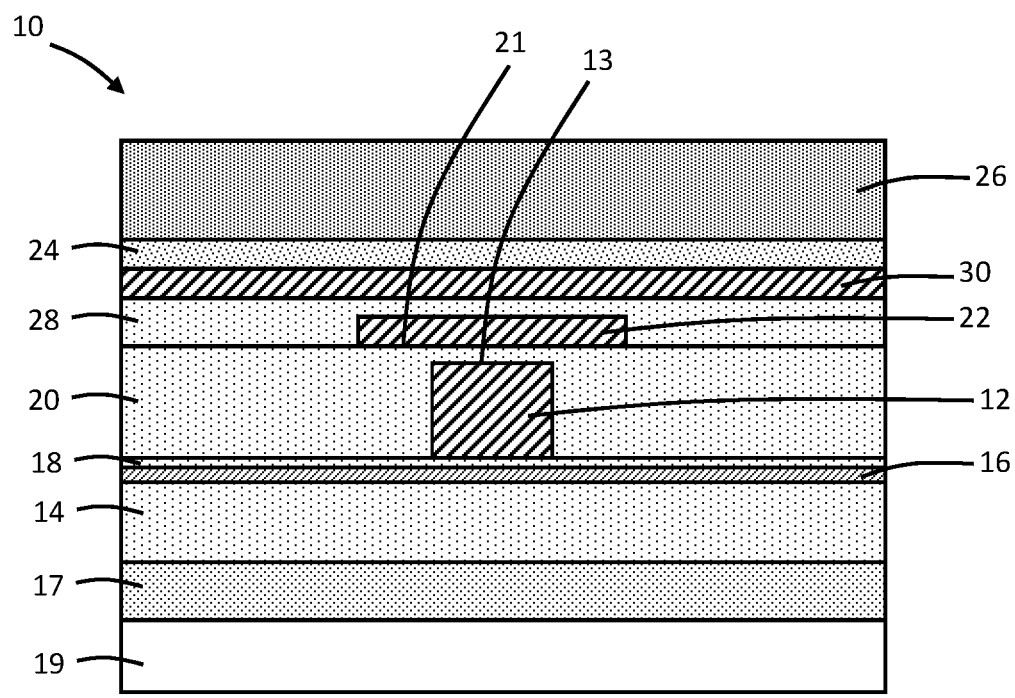
Figure 8:
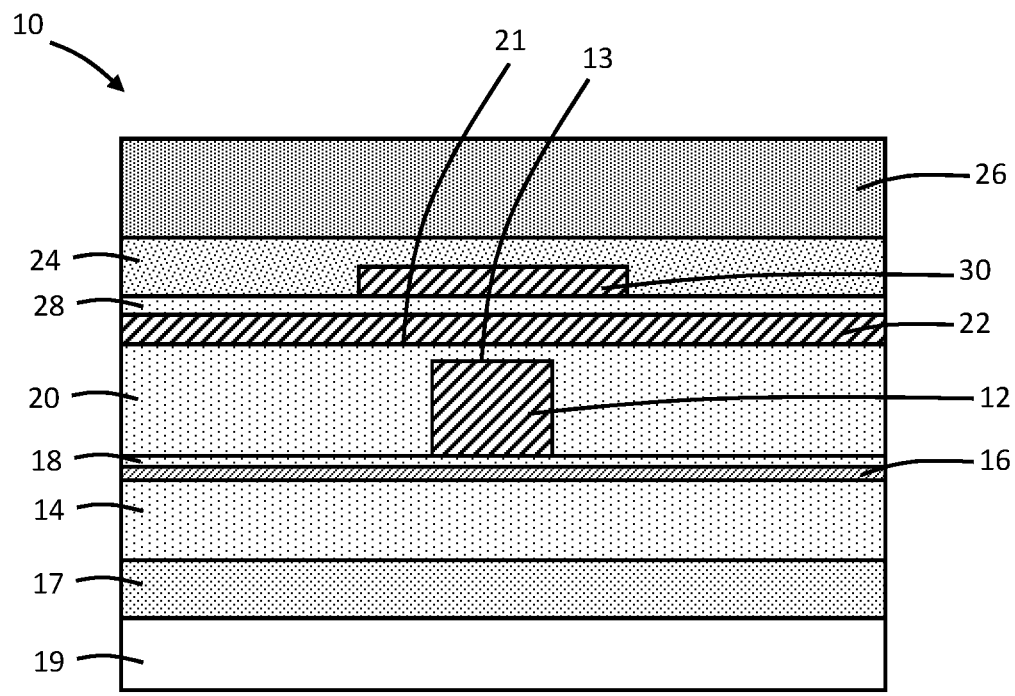

In alternative embodiments, only one or the other of the dielectric layers 22, 30 may be patterned such that either the dielectric layer 22 or the dielectric layer 30 maintains its as-deposited condition. For example and as shown in FIG. 7, the dielectric layer 22 may be patterned following its deposition, and the dielectric layer 30 may remain unpatterned and in its as-deposited state. The unpatterned dielectric layer 30 is arranged over the patterned dielectric layer 22 and is separated in a vertical direction from the patterned dielectric layer 22 by a portion of the dielectric layer 28. As another example and as shown in FIG. 8, the dielectric layer 30 may be patterned following its deposition, and the dielectric layer 22 may remain unpatterned and in its as-deposited state. The unpatterned dielectric layer 22 is arranged under the patterned dielectric layer 30 and is separated in a vertical direction from the patterned dielectric layer 30 by a portion of the dielectric layer 28.

The various embodiments adding one or more dielectric layers over a representative optical component in the form of the waveguide 12 may be incorporated into other types of optical components. Exemplary optical components that may benefit from the structure 10 include, but are not limited to, bends, couplers, tapers, crossings, etc.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a first dielectric layer comprised of a first silicon nitride;
    a waveguide arranged over the first dielectric layer; and
    a second dielectric layer arranged over the waveguide, the second dielectric layer comprised of a second silicon nitride having a lower absorption of optical signals than the first silicon nitride.

2. The structure of claim 1 wherein the waveguide has a first surface, and the second dielectric layer is arranged in direct contact with the first surface of the waveguide.

3. The structure of claim 2 further comprising:
    a third dielectric layer arranged to surround the waveguide, the third dielectric layer having a second surface that is coplanar with the first surface of the waveguide, and the third dielectric layer is in direct contact with the second surface of the second dielectric layer.

4. The structure of claim 3 wherein the third dielectric layer is comprised of an oxide of silicon.

5. The structure of claim 1 wherein the waveguide has a first surface, and the second dielectric layer has a non-contacting relationship with the first surface of the waveguide.

6. The structure of claim 5 further comprising:
    a third dielectric layer arranged to surround the waveguide, the third dielectric layer having a second surface that is arranged over the first surface of the waveguide, and a portion of the third dielectric layer is arranged between the waveguide and the second dielectric layer to provide the non-contacting relationship.

7. The structure of claim 6 wherein the third dielectric layer is comprised of an oxide of silicon.

8. The structure of claim 1 wherein the waveguide has a first width, the second dielectric layer has a second width, and the second width of the second dielectric layer is greater than the first width of the waveguide.

9. The structure of claim 1 wherein the waveguide has a first width, the second dielectric layer has a second width, and the second width of the second dielectric layer is greater than or equal to 1.1 times the first width of the waveguide.

10. The structure of claim 1 wherein the waveguide is comprised of the second silicon nitride.

11. The structure of claim 1 further comprising:
    a third dielectric layer over the second dielectric layer, the third dielectric layer comprised of the second silicon nitride.

12. The structure of claim 11 wherein the waveguide has a first width, the second dielectric layer has a second width, and the second width of the second dielectric layer is greater than the first width of the waveguide.

13. The structure of claim 12 wherein the third dielectric layer has a third width, and the third width of the third dielectric layer is greater than or equal to the first width of the waveguide.

14. The structure of claim 13 wherein the second width of the second dielectric layer is substantially equal to the third width of the third dielectric layer.

15. The structure of claim 11 wherein the waveguide has a first width, the third dielectric layer has a second width, and the second width of the third dielectric layer is greater than or equal to the first width of the waveguide.

16. A method comprising:
    forming a first dielectric layer comprised of a first silicon nitride;
    forming a waveguide arranged over the first dielectric layer; and
    forming a second dielectric layer arranged over the waveguide,
    wherein the second dielectric layer is comprised of a second silicon nitride having a lower absorption of optical signals than the first silicon nitride.

17. The method of claim 16 wherein the waveguide has a first surface, the second dielectric layer is in direct contact with the first surface of the waveguide, and further comprising:
    forming a third dielectric layer arranged to surround the waveguide, the third dielectric layer comprised of an oxide of silicon.

18. The method of claim 16 wherein the waveguide has a first surface, the second dielectric layer has a non-contacting relationship with the first surface of the waveguide, and further comprising:
    forming a third dielectric layer arranged to surround the waveguide and having a second surface that is arranged over the first surface of the waveguide,
    wherein a portion of the third dielectric layer is arranged between the waveguide and the second dielectric layer to provide the non-contacting relationship, and the third dielectric layer is comprised of an oxide of silicon.

19. The method of claim 16 further comprising:
    forming a third dielectric layer over the second dielectric layer,
    wherein the third dielectric layer is comprised of the second silicon nitride, the second dielectric layer has a second width, the waveguide has a first width, and the second width of the second dielectric layer is greater than the first width of the waveguide.

20. The method of claim 16 further comprising:
    forming a third dielectric layer over the second dielectric layer,
    wherein the second dielectric layer comprised of the second silicon nitride, the waveguide has a first width, the third dielectric layer has a second width, and the second width of the third dielectric layer is greater than the first width of the waveguide.

* * * * *